(12) United States Patent
Kane et al.

(10) Patent No.: US 10,671,405 B2
(45) Date of Patent: Jun. 2, 2020

(54) MONITORING FOR CO-LOCATED CONTAINERS IN A HOST SYSTEM

(71) Applicant: New Relic, Inc., San Francisco, CA (US)

(72) Inventors: Sean P. Kane, Camas, WA (US); Peter Vinh, Portland, OR (US); Erika Arnold, San Francisco, CA (US)

(73) Assignee: New Relic, Inc., San Francisco, CA (US)

( * ) Notice: Subject to any disclaimer, the term of this patent is extended or adjusted under 35 U.S.C. 154(b) by 0 days.

(21) Appl. No.: 15/900,741

(22) Filed: Feb. 20, 2018

(65) Prior Publication Data

US 2019/0065214 A1 Feb. 28, 2019

Related U.S. Application Data

(60) Provisional application No. 62/553,062, filed on Aug. 31, 2017.

(51) Int. Cl.
*G06F 9/44* (2018.01)
*G06F 9/4401* (2018.01)
(Continued)

(52) U.S. Cl.
CPC ........ *G06F 9/4411* (2013.01); *G06F 9/45558* (2013.01); *G06F 11/3409* (2013.01); *G06F 2009/45591* (2013.01)

(58) Field of Classification Search
None
See application file for complete search history.

(56) References Cited

U.S. PATENT DOCUMENTS 8,892,750 B1 * 11/2014 Krishnan .............. G06F 3/0622
709/228
9,626,253 B1 * 4/2017 Zhang ................. G06F 11/1458
(Continued)

FOREIGN PATENT DOCUMENTS

EP 2058746 B1 11/2015

OTHER PUBLICATIONS

PCT International Search Report and Written Opinion, PCT Application No. PCT/US2018/045400, dated Nov. 27, 2018, 10 pages.

*Primary Examiner* — Danny Chan
(74) *Attorney, Agent, or Firm* — Fenwick & West LLP

(57) ABSTRACT

A monitoring system receives information from agents that monitors (e.g., unprivileged) containers, or applications in containers, executing across hosts to generate aggregated state information on a per-host basis. The system receives state information for each container, boot identifiers associated with the hosts of the container, and container identifiers. State information includes data describing the state of a container, or an application executing in the container. The boot identifier includes an identifier for a boot session of the host. The container identifier uniquely identifies each container. The monitoring system compares boot identifiers to determine containers that are co-located. If containers share a boot identifier, the monitoring system determines that the containers are co-located on the host that generated the boot identifier. If containers do not share boot identifiers, the monitoring system determines that the containers are not co-located, and can match each container having different boot identifiers to their respective hosts.

19 Claims, 8 Drawing Sheets

(51) Int. Cl.
 *G06F 9/455* (2018.01)
 *G06F 11/34* (2006.01)

(56) References Cited

U.S. PATENT DOCUMENTS

| | | |
|---|---|---|
| 2008/0184022 A1* | 7/2008 | Peacock .............. G06F 11/1417 713/2 |
| 2009/0089428 A1 | 4/2009 | Antani et al. |
| 2009/0089429 A1 | 4/2009 | Antani et al. |
| 2010/0077199 A1* | 3/2010 | Hobson ................ G06F 21/572 713/100 |
| 2013/0136126 A1* | 5/2013 | Wang .................... H04L 61/103 370/392 |
| 2014/0331227 A1 | 11/2014 | Ahmad et al. |
| 2015/0378615 A1* | 12/2015 | Ramanujan .............. G11C 7/20 711/103 |
| 2016/0092687 A1 | 3/2016 | Boenisch et al. |
| 2016/0259941 A1* | 9/2016 | Vasudevan ............ G06F 21/575 |
| 2018/0157508 A1* | 6/2018 | Chen ........................ G06F 9/50 |
| 2018/0167217 A1* | 6/2018 | Brady .................. H04L 9/3247 |

\* cited by examiner

400

```
┌─────────────────────────────────────────────────┐
│ Generate state information regarding a component│
│              executing on a host                │
│                      410                        │
└─────────────────────────────────────────────────┘
                        │
                        ▼
┌─────────────────────────────────────────────────┐
│ Retrieve a boot identifier (ID) of the host that│
│      identifies a boot session of the host      │
│                      420                        │
└─────────────────────────────────────────────────┘
                        │
                        ▼
┌─────────────────────────────────────────────────┐
│      Determine a component ID of the component  │
│                      430                        │
└─────────────────────────────────────────────────┘
                        │
                        ▼
┌─────────────────────────────────────────────────┐
│  Send the state information, the boot ID, and   │
│  the component identifier to a monitoring system│
│  for monitoring of co-located components on the │
│                      host                       │
│                      440                        │
└─────────────────────────────────────────────────┘
```

FIG. 4

MONITORING FOR CO-LOCATED CONTAINERS IN A HOST SYSTEM

CROSS REFERENCE TO RELATED APPLICATION

This application claims the benefit of U.S. Provisional Application No. 62/553,062, filed Aug. 31, 2017, which is incorporated by reference in its entirety.

BACKGROUND

The disclosure generally relates to monitoring computer servers, and in particular to monitoring individual components located on computer servers.

Internet-based applications are common tools for delivering content and services to user computing devices. These applications are typically executed within a scalable component, such as an operating system container, on a host that provides content to the computing devices by receiving requests from the computing devices and sending responses to the computing devices. Historically, components containing related applications may be co-located within a shared host, or spread across multiple hosts. Each component may be monitored by a monitoring system for performance and state information while a request is being processed.

The monitoring system may receive performance and state information from components that do not identify the hosts on which they execute. Resultantly, the monitoring system may be unable to identify components that are executing on a shared host. This abstraction may prove problematic for performance monitoring purposes in that the monitoring system may be unable to associate a component with other components co-located on the same host. In addition, this abstraction may introduce licensing management difficulties in that applications executing within containers spread across hosts may obfuscate licensing usage metrics for a pricing model based on a per-host basis.

SUMMARY

A monitoring system receives information from agents that monitor components, such as containers or applications in containers, executing across hosts to generate aggregated state information on a per-host basis. Multiple containers may be co-located on a single host. The system receives the information including state information for each container, boot identifiers associated with the hosts of the container, and identifiers for the containers. The state information includes data pertaining to the state of a container, or an application executing in the container, executing on the host. The boot identifier includes an identifier for a boot session of the host, which is accessible from the host by any agent. The container identifier, when transmitted, uniquely identifies each container. The monitoring system compares boot identifiers received in connection with state information from agents monitoring containers to determine that the containers are co-located. For example, two containers sharing the same boot ID within a defined time window indicates that they are in a common boot session (the period of time in which an operating system is loaded into the host's memory) of a host. In the event that containers share a boot identifier, the monitoring system determines that the containers are co-located on the host that generated the boot identifier. If containers do not share boot identifiers (e.g., and the boot session is determined to be still active per communications with other agents), the monitoring system determines that the containers are not co-located on a host, and can match each container having different boot identifiers to their respective hosts. In addition, being able to uniquely identify co-located containers allows the monitoring system to correlate the gathered information across containers and the underlying host.

BRIEF DESCRIPTION OF THE DRAWINGS

FIG. 4 is a flow diagram illustrating a process for collecting and reporting state information by the agent of a component executing on a host, according to one embodiment.

DETAILED DESCRIPTION

Figure 1:
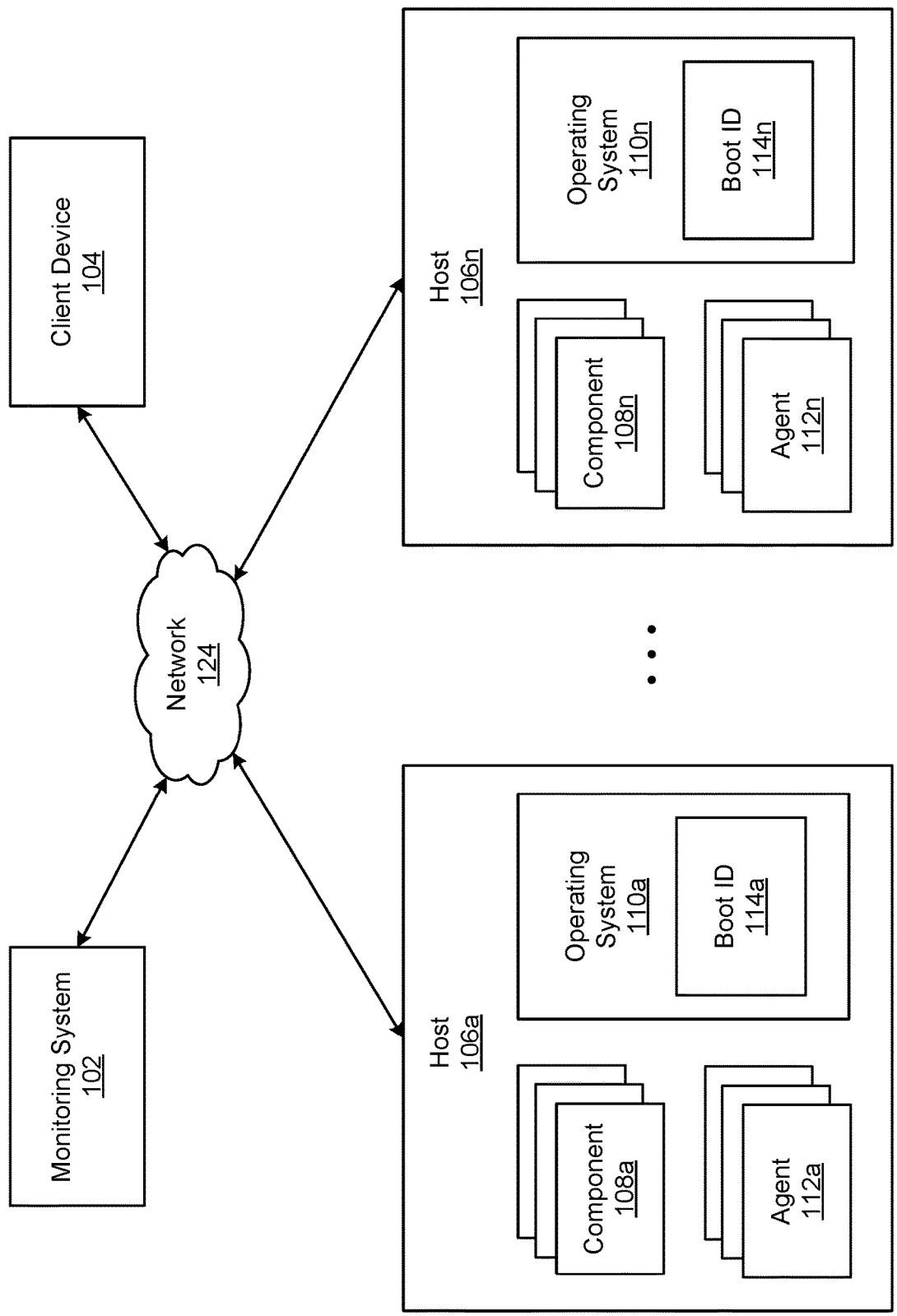
FIG. 1 is a block diagram of a system environment for monitoring hosts, according to one embodiment.

FIG. 1 illustrates a system environment for monitoring hosts, according to one embodiment. The environment includes a monitoring system 102 (discussed in reference to FIG. 2), a client device 104, and hosts 106a-106n (or "host 106"). The hosts 106a-106n, the monitoring system 102, and the client device 104 may communicate over a network 124, which may include the Internet.

The client device 104 is a device with computing functionality and data communication capabilities capable of receiving user input as well as transmitting and/or receiving data via the network 124. The client device 104 communicates with the host 106 via the network 124. In various embodiments, the client device 104 may be a wired user device, such as a desktop computer, or a mobile user device, such as a laptop computer, a personal digital assistant (PDA), a mobile telephone, a smartphone, tablet, or wearable device. The client device 104 may be used by an operator of the host 106 and/or the monitoring system 102. For example, the client device 104 may be used by an operator of the monitoring system 102 to receive updates, from the host 106, concerning the performance of components 108 executing on the host 106. Although a single client device 104 is shown in FIG. 1, the environment may include any number of client devices 104.

The host 106 may include circuitry (e.g., servers) that executes an operating system 110, components 108, and one or more agents 112. The components 108 may include containers that execute on the host 106, and/or include applications and agents executing in the containers. Each component 108 that executes on the host 106 may be associated with a component identifier that the monitoring system 102 uses along with the boot ID 114 to determine co-located components in the same host 106.

The boot ID 114 is a value (e.g., hash) that uniquely identifies the boot session of the operating system 110. The operating system 110 may generate the boot ID 114 upon startup or in response to a request, and may store the boot ID as accessible data to the agent 112 and/or the component 108. The host 106 may be a physical machine (e.g., a server), or a virtual machine or cloud instance. In some embodiments, the boot ID is a large randomly generated value to reduce the likelihood of collisions in boot ID values across different hosts in different boot sessions.

For example, if the host 106a performed a startup or reboot operation, the operating system 110 may assign a different boot ID 114a to the boot session running on the host 106a for the new boot session. Similarly, the host 106n, which is another host monitored by the system 102, can generate a boot ID upon start up and keep the boot ID throughout the boot session (e.g., even if the host 106a generates a new boot ID for a new boot session). These boot IDs 114 are associated with components 108, such as using the component identifiers, to determine components co-located on the same host 106. Boot IDs 114 are reported to the monitoring system 102 by each agent 112 executing on each host 106.

In one embodiment, the host 106 executes an agent 112 in addition to the components 108. The agent 112 monitors performance of the component 108, such as processes running on the host 106, response time of the component 108, transactions in the component 108, the effect of backend processes on performance of the component 108 at client devices 104, or other types of state information. In one embodiment, each component 108 executes its own agent 112 that monitors component 108 performance. In another embodiment, there is an agent 112 executing on the host 106 that monitors and generates state information regarding multiple components 108. In some embodiments, the components 108 (e.g., applications, containers, etc.) and the agents 112 are co-located on a shared kernel of the operating system 110, and have access to some shared information such as the boot ID 114. The agent 112 collects and stores state information relevant to the performance of the application, and periodically reports the state information to the monitoring system 102 in connection with the boot ID 114 of the host for host identification.

Figure 2:
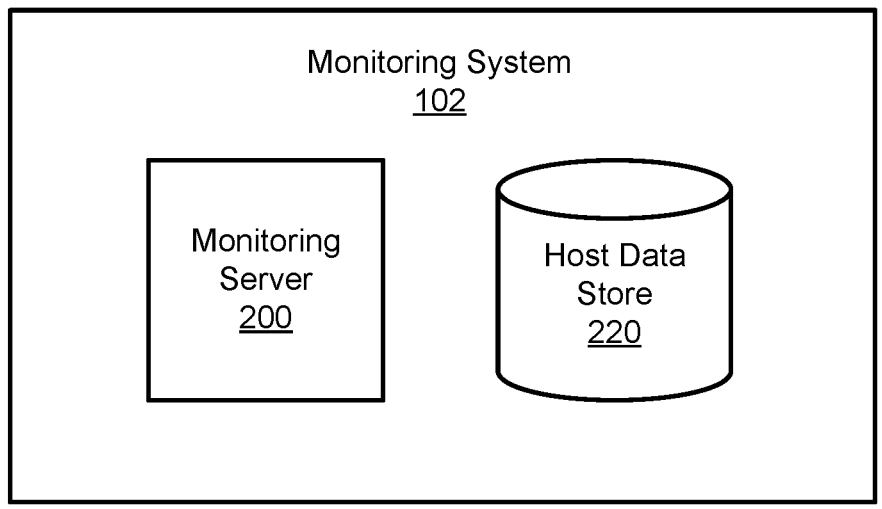
FIG. 2 is a schematic block diagram illustrating a monitoring system that monitors components and hosts, according to one embodiment.

FIG. 2 is a schematic block diagram illustrating a monitoring system 102 that monitors components 108 and hosts 106, according to one embodiment. The monitoring system 102 includes a monitoring server 200 and a host data store 220.

The monitoring server 200 is an external computing device to the host 106 that monitors performance of the host 106 and its components 108. The monitoring server 200 may monitor the performance of any number of hosts 106 on a per host basis, or of the components of hosts. While the host 106 executes the agent 112, the monitoring server 200 communicates with the agent 112 to monitor performance of the components 108 in the host 106. The monitoring server 200 receives reports from the agent 112 and formats data in the reports for analysis by an administrator of the host 106, enabling the administrator to address any performance issues in the component 108 or host 106. For example, the monitoring server 200 generates plots illustrating response times of the component 108, displays transaction traces of slow or otherwise notable transactions, and provides statistics from the host (e.g., virtual machine) running the component 108.

In one embodiment, the monitoring server 200 also receives information from an agent 112 executing on the host 106 describing the boot ID 114 assigned to the boot session on the host 106. The boot ID 114, generated by the operating system 110 on the host 106, is assigned to each component 108 executing on the host 106. The agent 112 fetches the boot ID 114, in addition to component identifiers and component state information, and supplies this data to the monitoring server 140. The monitoring server 140 uses the data from the agent 112 to determine aggregated information about components and/or hosts. For example, usage information may be tracked on a per-host basis across multiple co-located containers to determine licensing consumption information on a per-host basis. The monitoring server 200 can aggregate state information from multiple co-located components to determine overall usage for the underlying host 106.

The monitoring system 102 uses the host data store 220 to store identities of co-located components 108 executing on a host 106 in relation to boot IDs 114. The monitoring system 102 determines co-located components 108 and stores the component identifier for each component with the boot ID 114 of the boot session currently executing at the time the co-location was identified. In the event of a startup causing a new boot session on the host 106, the agent 112 sends subsequently generated state information with a new boot ID of the new boot session. The monitoring server 200 can use information stored in the host data store 220 to cross-reference previously stored component identifiers, provided to the monitoring system 102, belonging to components 108 determined to be co-located. The monitoring server 200 can update this information to include the new boot ID 114 reported due to the reboot instance, allowing the monitoring server 200 to continue aggregating usage information for the host 106 despite a change in boot ID 114. For example, if components A, B, and C are co-located on host 106a, the host data store 220 can associate each component with the new boot ID 114 generated for the new boot session. If host 106a underwent a reboot, the operating system 110a would generate a new boot ID 114 to reflect the new boot session. In order to continue monitoring the performance and usage of host 106a, the monitoring server 200 can identify components A, B, and C in the host data store 220 and determine that they are co-located from their sharing of the previous boot ID 114. The monitoring server 200 can then store the new boot ID 114 in the host data store 220 and continue monitoring host 106a.

Figure 3:
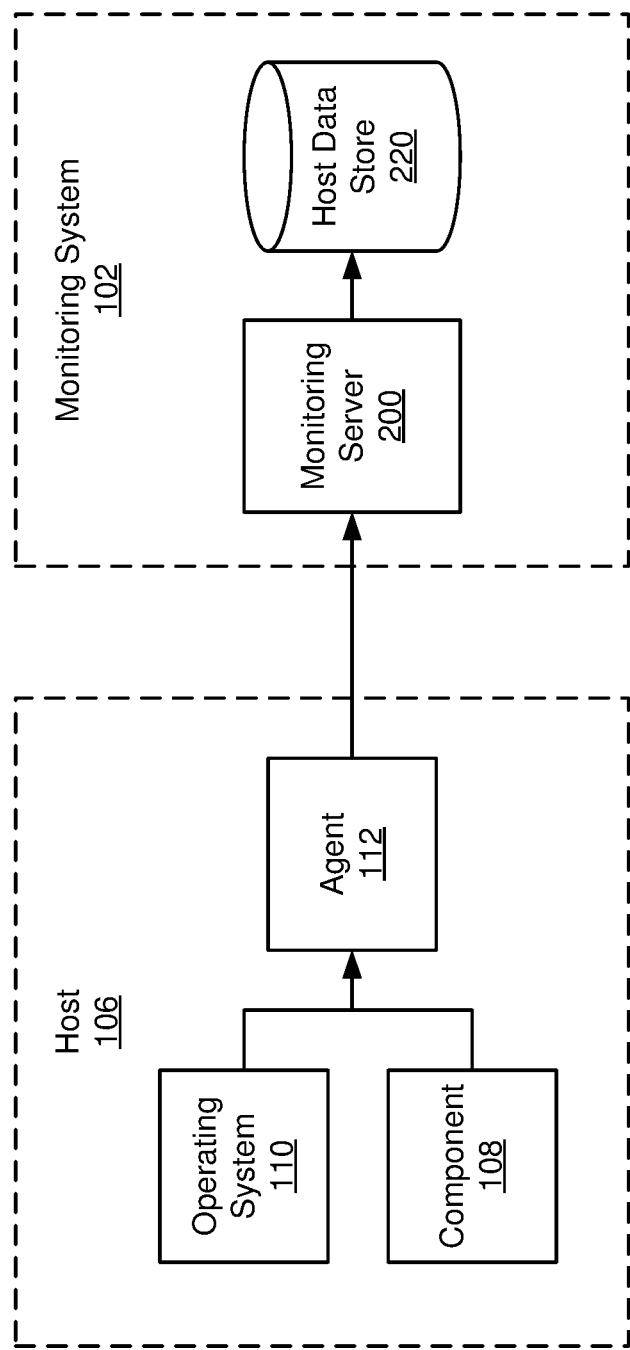
FIG. 3 is a flow diagram illustrating the process of determining and storing state information of co-located components, according to one embodiment.

FIG. 3 is a flow diagram illustrating the process of determining and storing state information of co-located components 108, according to one embodiment. Although a single agent is shown as being shared by the operating system 110 and the component 108 in the embodiment illustrated in FIG. 3, the operating system 110 and each component 108 can contain its own agent. When the agent 112 is reporting an instance of state information regarding a component 108, the agent 112 accesses the boot ID 114 generated by the operating system 110 of host 106 of the boot session. In addition, the agent 112 may collect the state information and the component identifier from the component 108. The agent 112 provides the state information in connection with the boot ID (and component identifier, in some embodiments) to the monitoring server 200 in the monitoring system 102. The monitoring server 200 uses boot ID 114 to determine co-location of the component 108 with other components that have reported the same boot ID. In another example, the monitoring server 200 compares component identifier of the component 108 with previous component identifiers reported by the component 108 to identify a new boot session. The boot IDs associated with other known components 108 co-located in the host may be updated accordingly.

FIG. 4 is a flow diagram illustrating a process 400 for collecting and reporting state information by the agent 112 of a component 108 executing on a host 106, according to one embodiment. As discussed above, the host 106 may be a server, a cloud instance, or a virtual machine. The monitored component 108 may be an application, or an application executing in the container. The agent 112 observes each component 108 on the host 106 and generates 410 state information to describe the state of each component 108 along various monitored parameters such as response times, traffic or network usage, number of requests, usage amounts, etc. The agent 112 may generate the state information on a regular or scheduled basis, or upon detection of events in the component 108 or host 106 that trigger the collection of the state information.

In response to generating the state information, the agent 112 retrieves 420 a boot ID 114 of the host 106 generated by the operating system 110 used to identify a boot session on the host 106. Containers by design provide isolation of the application from the underlying host. This makes it difficult to determine certain facts (like hostname) about the underlying host that can be useful for the process running inside the container, without requiring the container to run with special privileges or using specialized configurations. As such, the agent 112 uses information that is accessible to any unprivileged application which can be used to identify the host. Although a boot ID is discussed herein as being used as the host identifier, other types of host or host device identifying data that the operating system permits to the application in the container may be used.

The agent 112 determines 430 a component identifier of the component pertaining to the state information on the host 106. The component identifier may be an identifier of an application or the container, which the operating system does not restrict from the agent 112. Each container monitored by the monitoring system 102 may have a unique component identifier.

The agent 112 sends 440 the state information, the boot ID, and the component ID to the monitoring system 102 for determination of co-located components and monitor the overall usage of host 106. The process 400 may be performed in parallel by multiple agents 112 that monitors multiple components. The components 108 may be distributed across multiple hosts 106, which the monitoring system 102 is able to resolve using boot IDs from the agents 112.

Figure 5:
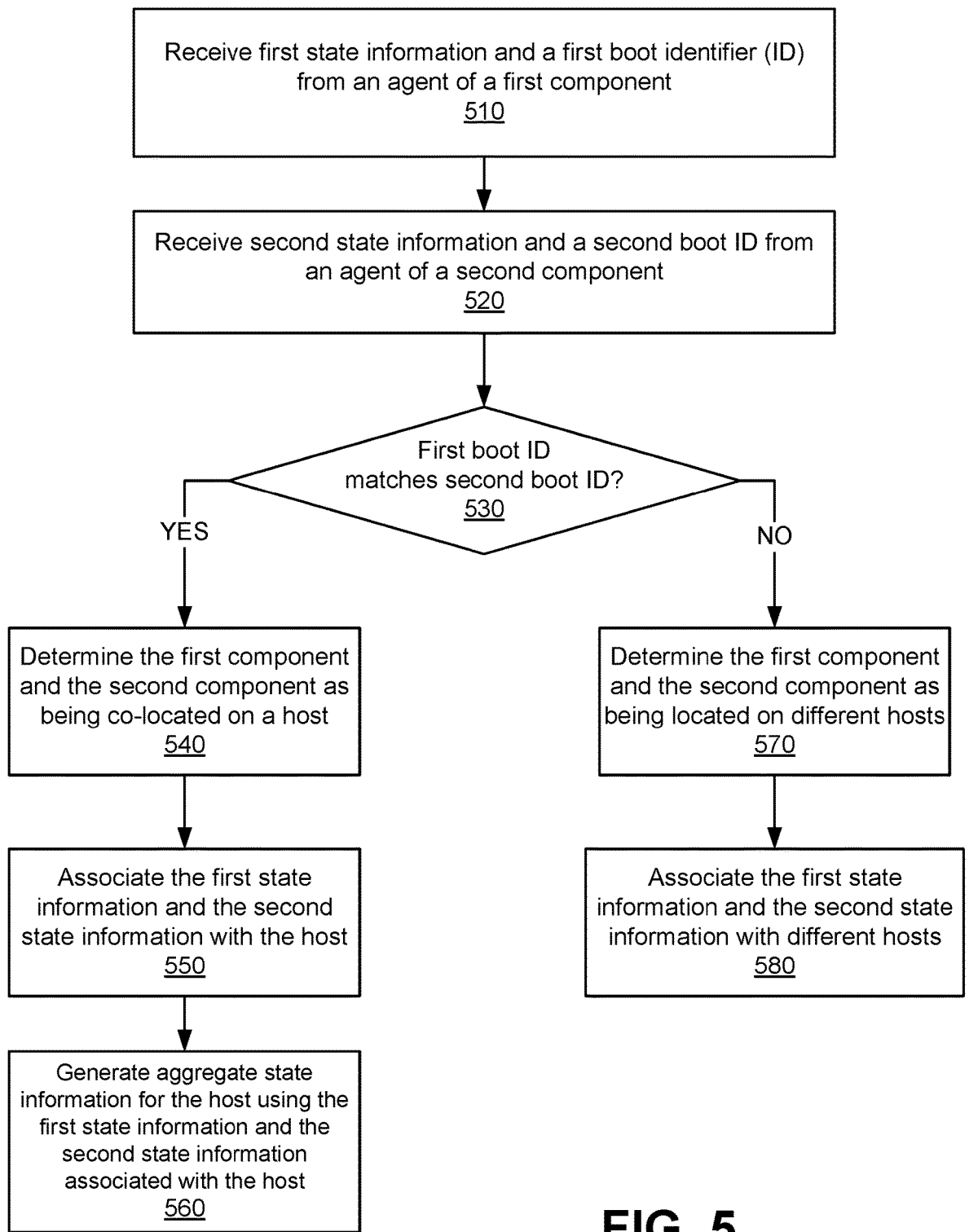
FIG. 5 is a flow diagram illustrating the process for identifying co-located components in a host and generating aggregated state information regarding the host, according to one embodiment.

FIG. 5 is a flow diagram illustrating the process 500 for identifying co-located components 108 in a host 106 and generating aggregated state information regarding the host 106, according to one embodiment. In process 500, state information received from two agents of different components are identified as executing on the same host, or different hosts.

The monitoring server 200 receives 510 first state information and a first boot ID 114 from an agent 112 executing on a first component 108. For example, the agent 112 may send the state information and boot ID as discussed in the process 400 and FIG. 4.

The monitoring server 200 receives 520 second state information and a second boot ID 114 from an agent of a second component 108. The second state information may be received subsequent to the first state information, or the first state information may be received subsequent to the second state information.

In some embodiments, the monitoring server 200 may determine that the first component 108 and the second component 108 are different components based on the component IDs. The first component ID of the first component 108 may be received with the first state information at 510, and the second component ID for the second component 108 may be received with the second state information 520. The server 200 compares the component IDs, and determines that the first component 108 and the second component 108 are different when the component IDs fail to match, and determines the first and second components 108 are the same when the component IDs match.

The monitoring server 200 determines 530 whether the first boot ID 114 matches the second boot ID 114. In response to determining that the first and second boot IDs 114 match (or otherwise correspond), the monitoring server 200 determines 540 that the first component 108 and the second component 108 as being co-located on a host 106. In some embodiments, the monitoring server 200 may determine whether the first boot ID 114 and the second boot ID 114 were received within a time window (e.g., the period of time in which an operating system 110 is loaded into the memory of the host 106, and thus is using a particular boot ID). If the monitoring server 200 determines that the first and second boot IDs were received within a time window and match, the first and second boot IDs 114 can be determined as corresponding with components on the same host 106. In contrast, if two identical boot IDs 114 are received outside of the time window, the monitoring server 200 can determine that they are not matching, or may perform further analysis such as to confirm the current boot ID of the operating system via communication with an agent.

The monitoring server 200 associates 550 the first state information and the second state information with the identified host 106. For example, the first component and the second component may be associated (e.g., by boot ID) as being co-located. Subsequent changes to the boot ID received from one of the components may be propagated to associations of other components.

The monitoring server 200 generates 560 aggregate state information for the host 106 using the first and second state information. For example, the state information from co-located components may be combined to provide information about the host. For example, if co-located components are containers with application servers, then the state information from each of the applications such as response time, number of requests, bandwidth usage, etc., may be combined across the co-located components in the host to provide state information, or other analytics based from the state information, on a per-host basis.

Returning to 530, if the first boot ID 114 and the second boot ID 114 fail to match 530, the monitoring server 200 determines 570 that the first component 108 and the second component 108 are located on different hosts 106. For example, multiple host 106 operate concurrently in separate boot sessions, each identified by a unique boot ID. When different boot IDs are received from different components 108, then the components 108 can be determined to be on different hosts 106.

The monitoring server 200 associates 580 the first state information and the second state information with different hosts 106. For example, the first state information may be associated with other state information received with the first boot ID, and the second state information may be associated with other state information received with the second boot ID.

Figure 6:
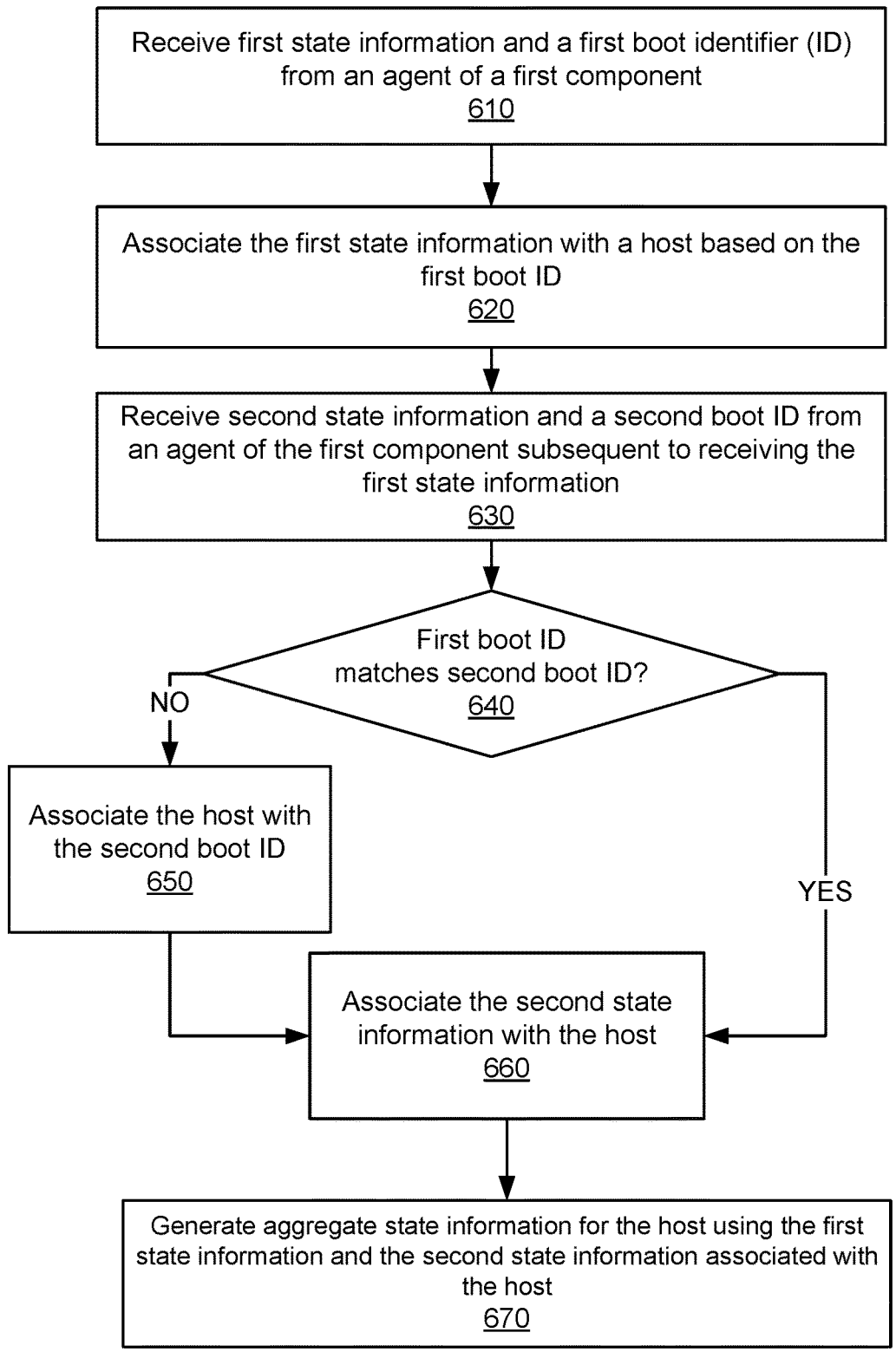
FIG. 6 illustrates a process for handling new boot sessions in a host, according to one embodiment.

FIG. 6 illustrates a process 600 for handling new boot sessions in a host, according to one embodiment. The process 600 includes receiving different instances of state information frame a component, which is on a single host. When a new instance of state information for a component that has been previously associated with a boot ID is received in connection with a different boot ID, the host may be determined to have started a new boot session. The previous boot ID may be identified as stale, and other components associated with the stale boot ID may be updated to include associations with the new boot ID. If the boot ID is a large random value, there is a low probability of boot ID collisions at any single time even when the monitoring server 200 monitors multiple hosts 106 and components 108. For example, the monitoring server may compare new instances of boot IDs only with active, non-stale boot IDs.

The monitoring server 200 receives 610 first state information and a first boot ID 114 from an agent 112 of a first component 108. The monitoring server 200 associates 620 the first state information with a host 106 based on the first boot ID 114.

The monitoring server 200 receives 630 second state information and a second boot ID 114 from an agent of the first component 108. The second state information is received subsequent to the first state information. As discussed above, a component ID transmitted to the monitoring server 200 from the agent 112 may be used to uniquely identify components 108. Thus, the monitoring server 200 determines that the first and second state information and first and second boot ID 114 are from the same component 108. The first and second state information may be transmitted by the same agent 112, or a different agent 112. For example, the agent that sends the second state information and boot ID 114 may be the same agent that sent the first state information and boot ID 114 in step 610. In another example, multiple agents may monitor a component, or an agent may be reassigned to a different component.

The monitoring server determines 640 whether the first boot ID 114 matches the second boot ID 114. In response to determining that the first boot ID 114 fails to match the second boot ID, the monitoring server 200 associates 650 the host 106 with the second boot ID 114. If component 108 executes in the same host, then boot ID can be determined to have changed for the host, and thus a new boot session was initiated.

The monitoring server 200 associates 660 the second state information with the host 106. For example, both the first and second state information may be associated with the same host 106 even when a different boot ID has been received. As such, the server 200 efficiently maintains identification of co-located containers in hosts even if the hosts perform reboot operations at intermittent, unknown, or unscheduled times.

The monitoring server 200 generates 670 aggregate state information for the host 106 using the first state information and the second state information associated with the host 106. The aggregate state information for the host 106 is generated by processing multiple instances of state information that has been identified as being associated with the host 106.

Returning to 640, in response to determining that the first boot ID matches the second boot ID, the monitoring server 200, associates 660 the second state information with the host 106. The boot ID has not changed, which indicates that the host is in the same boot session, and also that other components 108 known to be co-located in the host should return the same boot ID. The monitoring server 200 then generates 670 aggregate state information for the host 106 using the first state information and the second state information associated with the host 106.

Figure 7:
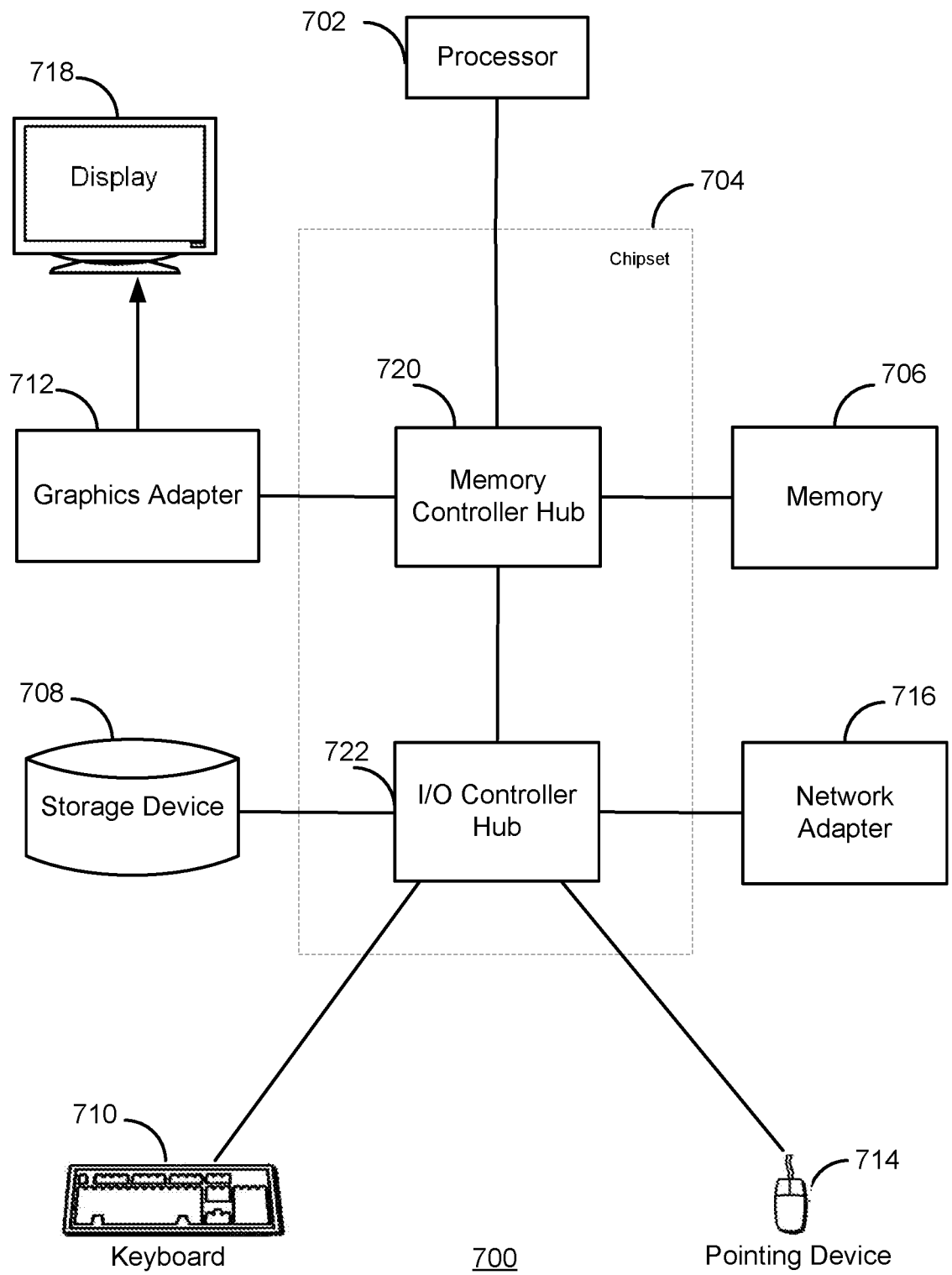
FIG. 7 is a high-level block diagram illustrating an example of a computer, according to one embodiment.

FIG. 7 is a high-level block diagram illustrating an example of a computer 700, according to one embodiment. The computer 700 is an example of circuitry that implements components of the monitoring system 102, client device 104, or hosts 106. Illustrated are at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display device 718 is coupled to the graphics adapter 712. A storage device 708, keyboard 710, pointing device 714, and network adapter 716 are coupled to the I/O controller hub 722. Other embodiments of the computer 700 have different architectures. For example, the memory 706 is directly coupled to the processor 702 in some embodiments.

The storage device 708 includes one or more non-transitory computer-readable storage media such as a hard drive, compact disk read-only memory (CD-ROM), DVD, or a solid-state memory device. The memory 706 holds instructions and data used by the processor 702. The pointing device 714 is used in combination with the keyboard 710 to input data into the computer system 700. The graphics adapter 712 displays images and other information on the display device 718. In some embodiments, the display device 718 includes a touch screen capability for receiving user input and selections. The network adapter 716 couples the computer system 700 to the network 124. Some embodiments of the computer 700 have different and/or other components than those shown in FIG. 7.

The computer 700 is adapted to execute computer program modules for providing functionality described herein. For example, some embodiments may include a computing device including one or more modules configured to perform the processes 400, 500, and 600 shown respectively in FIGS. 4, 5, and 6. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 708, loaded into the memory 706, and executed by the processor 702.

Figure 8A:
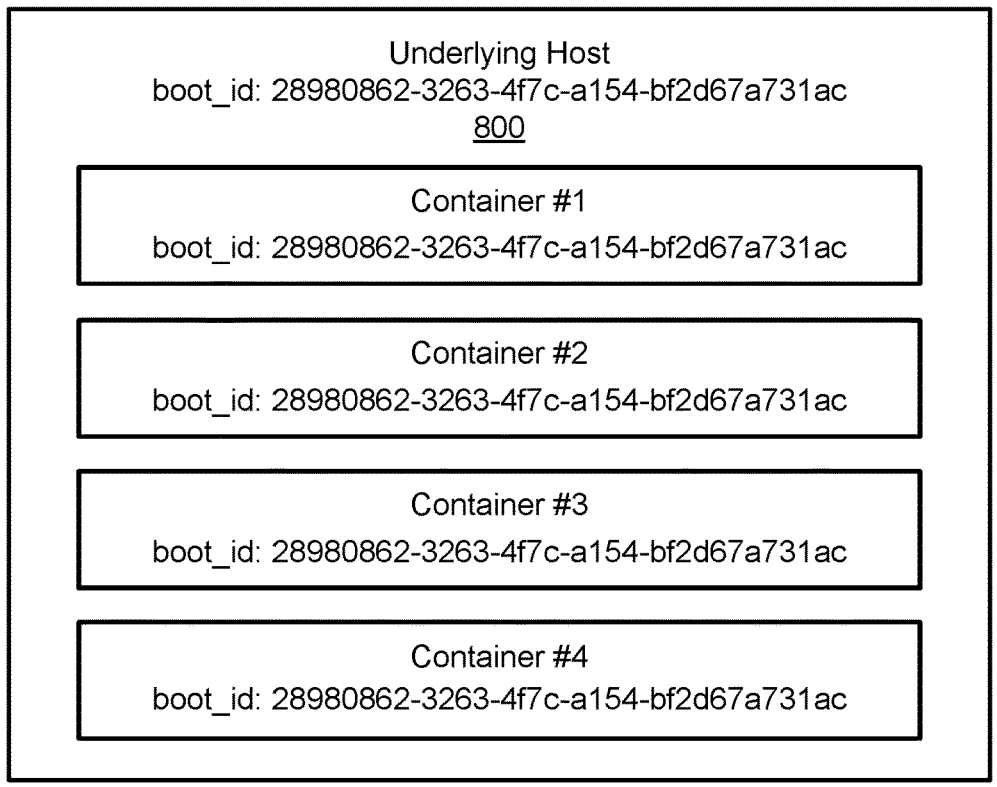
FIG. 8A is a schematic diagram of a host including boot IDs, according to one embodiment.

FIG. 8A is a schematic diagram of a host including boot IDs, according to one embodiment. The component is a (e.g., Linux) container executing with standard, unprivileged access to the underlying host 800 and its operating system. The underlying host 800 generates a 32 digit boot ID, which is accessible to each container. The 32 digit boot ID may include alphanumeric characters in each digit to provide a large number of possible unique boot IDs. In the embodiment illustrated in FIG. 8A, boot ID 28980862-3263-4f7c-a154-bf2d67a731ac is accessible to Containers #1, #2, #3, and #4. In other embodiments, a greater or fewer number of containers may execute on an underlying host 800. Other embodiments may also include a greater or fewer number of digits comprising a unique boot ID.

Figure 8B:
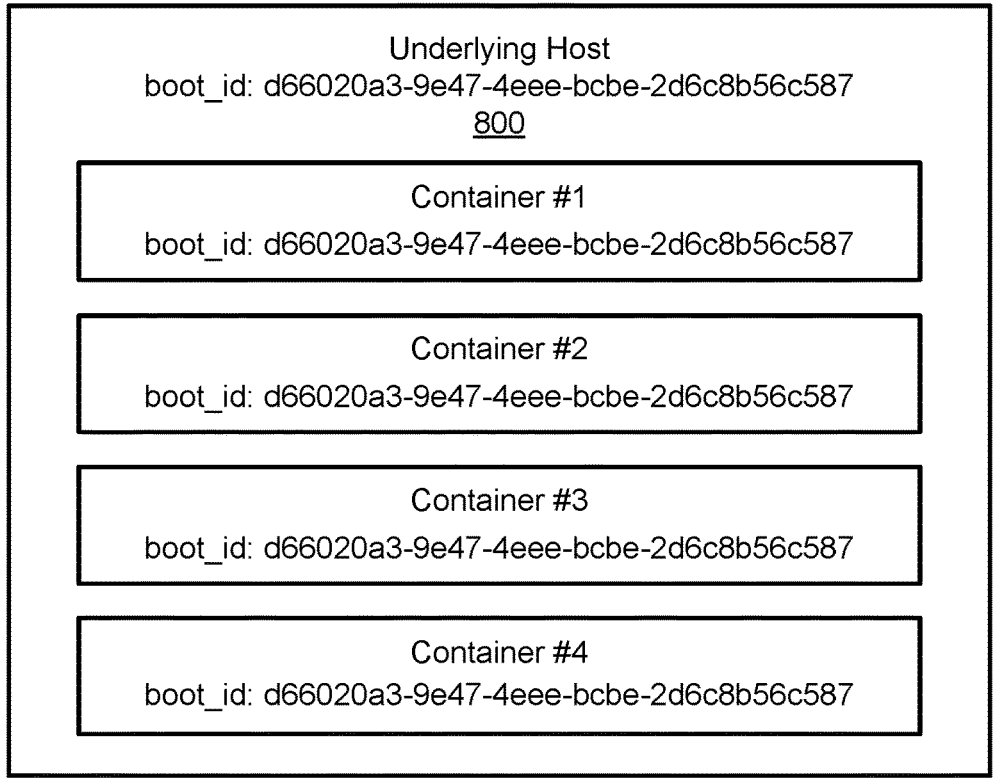
FIG. 8B is a schematic diagram of a host including updated boot IDs, according to one embodiment.

FIG. 8B is a schematic diagram of the host of FIG. 8A including updated boot IDs, according to one embodiment. A reboot, startup, or some other process that on the host may result in a new boot session and boot ID. An updated boot ID may be generated in response to a reboot, startup, or any other process that may result in a new boot session on the underlying host 800. The updated boot ID of the underlying host 800 is accessible to each of the containers co-located on the underlying host 800. In the embodiment illustrated in FIG. 8B, updated boot ID d66020a3-9e47-4eee-bcbe-2d6c8b56c587 is accessible to Containers #1, #2, #3, and #4. In other embodiments, a greater or fewer number of containers may execute on an underlying host 800. Other embodiments may also include a greater or fewer number of digits comprising a unique boot ID.

CONCLUSION

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the invention.

What is claimed is:

1. A method, comprising:
   receiving, from an agent of a first component executing on a host, first state information regarding the first component and a first boot identifier, the first boot identifier being generated by the host in connection with a startup of an operating system of the host to identify a boot session of the operating system of the host, the first boot identifier being accessible to the agent from the host, the host generating different boot identifiers for different boot sessions;
   determining whether the first boot identifier matches a second boot identifier associated with second state information regarding a second component; and
   in response to determining that the first boot identifier matches the second boot identifier:
     determining the first component and the second component as being co-located on the host, wherein the first component and the second component are containers on the host;
     associating the first state information of the first component and the second state information of the second component with the host; and
     generating aggregate state information for the host using the first state information and the second state information associated with the host.

2. The method of claim 1, further comprising:
   receiving, from the agent, a first component identifier in connection with the first boot identifier, the first component identifier identifying the first component; and
   in response to determining that the first boot identifier matches the second boot identifier, associating the first component identifier with the host.

3. The method of claim 2, further comprising:
   receiving, from the agent of the first component executing on the host, third state information regarding the first component and a third boot identifier, the third state information and the third boot identifier received subsequent to receiving the first and second boot identifiers;
   determining whether the first boot identifier of the first component matches with the third boot identifier of the first component; and
   in response to determining that the first boot identifier fails to match the third boot identifier:
     associate the host with the third boot identifier; and
     generate aggregate state information for the host using the first state information, the second state information, and the third state information associated with the host.

4. The method of claim 3, wherein:
   receiving the first state information includes receiving the first component identifier;
   receiving the third state information includes receiving a second component identifier; and
   determining whether the first boot identifier of the first component matches with the third boot identifier of the first component includes comparing the first component identifier and the second component identifier.

5. The method of claim 1, further comprising:
   in response to determining that the first boot identifier fails to match the second boot identifier, associating the first state information of the first component with the host and the second state information of the second component with a second host.

6. The method of claim 1, wherein the first boot identifier includes a random value generated responsive to a boot up of the host.

7. The method of claim 1, wherein the host includes at least one of a server machine, a virtual machine, or a cloud instance.

8. The method of claim 1, wherein the first state information includes information regarding the first component or an application executing in the first component.

9. The method of claim 1, wherein the agent retrieves the first boot identifier from an accessible directory in the host and sends the first boot identifier with the first state information.

10. The method of claim 1, wherein the agent sends a request for the first boot identifier to an operating system of the host and receives the first boot identifier from the operating system in response to the request.

11. The method of claim 1, wherein an operating system of the host associates a component identifier with the first component that is inaccessible to the agent executing on the host.

12. A non-transitory computer readable storage medium having instructions encoded thereon that, when executed by a processor, cause the processor to perform the steps including:
receiving, from an agent of a first component executing on a host, first state information regarding the first component and a first boot identifier, the first boot identifier being generated by the host in connection with a startup of an operating system of the host to identify a boot session of an operating system of the host, the first boot identifier being accessible to the agent from the host, the host generating different boot identifiers for different boot sessions;
determining whether the first boot identifier matches a second boot identifier associated with second state information regarding a second component; and
in response to determining that the first boot identifier matches the second boot identifier:
determining the first component and the second component as being co-located on the host, wherein the first component and the second component are containers on the host;
associating the first state information of the first component and the second state information of the second component with the host; and
generating aggregate state information for the host using the first state information and the second state information associated with the host.

13. The non-transitory computer readable storage medium of claim 12, further comprising:
receiving, from the agent, a first component identifier in connection with the first boot identifier, the first component identifier identifying the first component; and
in response to determining that the first boot identifier matches the second boot identifier, associating the first component identifier with the host.

14. The non-transitory computer readable storage medium of claim 13, further comprising:
receiving, from the agent of the first component executing on the host, third state information regarding the first component and a third boot identifier, the third state information and the third boot identifier received subsequent to receiving the first and second boot identifiers;
determining whether the first boot identifier of the first component matches with the third boot identifier of the first component; and in response to determining that the first boot identifier fails to match the third boot identifier:
associate the host with the third boot identifier; and
generate aggregate state information for the host using the first state information, the second state information, and the third state information associated with the host.

15. The non-transitory computer readable storage medium of claim 14, wherein:
receiving the first state information includes receiving the first component identifier;
receiving the third state information includes receiving a second component identifier; and
determining whether the first boot identifier of the first component matches with the third boot identifier of the first component includes comparing the first component identifier and the second component identifier.

16. The non-transitory computer readable storage medium of claim 12, further comprising:
in response to determining that the first boot identifier fails to match the second boot identifier, associating the first state information of the first component with the host and the second state information of the second component with a second host.

17. The non-transitory computer readable storage medium of claim 12, wherein the first boot identifier includes a random value generated responsive to a boot up of the host.

18. The non-transitory computer readable storage medium of claim 12, wherein the host includes at least one of a server machine, a virtual machine, or a cloud instance.

19. A system comprising:
a processor configured to:
receive, from an agent of a first component executing on a host, first state information regarding the first component and a first boot identifier, the first boot identifier being generated by the host in connection with a startup of an operating system of the host to identify a boot session of the operating system of the host, the first boot identifier being accessible to the agent from the host, the host generating different boot identifiers for different boot sessions;
determine whether the first boot identifier matches a second boot identifier associated with second state information regarding a second component; and
in response to determining that the first boot identifier matches the second boot identifier:
determine the first component and the second component as being co-located on the host, wherein the first component and the second component are containers on the host;
associate the first state information of the first component and the second state information of the second component with the host; and
generate aggregate state information for the host using the first state information and the second state information associated with the host.

* * * * *

UNITED STATES PATENT AND TRADEMARK OFFICE
CERTIFICATE OF CORRECTION

PATENT NO. : 10,671,405 B2
APPLICATION NO. : 15/900741
DATED : June 2, 2020
INVENTOR(S) : Kane et al.

Page 1 of 1

It is certified that error appears in the above-identified patent and that said Letters Patent is hereby corrected as shown below:

On the Title Page

Item (72) Column 1, in "Inventors", Line 3, delete "San Francisco, CA" and insert -- Portland, OR --, therefor.

Item (51) Column 1, under "Int. Cl.", Line 2, delete "9/4401" and insert -- 9/4411 --, therefor.

Signed and Sealed this
First Day of December, 2020

Andrei Iancu
*Director of the United States Patent and Trademark Office*